United States Patent [19]

Brown

[11] Patent Number: 5,022,572
[45] Date of Patent: Jun. 11, 1991

[54] PROTECTIVE COVER FOR PORTABLE BICYCLE TIRE PUMPS

[76] Inventor: Steven W. Brown, 4005 Orangedale, Montrose, Calif. 91020

[21] Appl. No.: 492,602

[22] Filed: Mar. 13, 1990

[51] Int. Cl.[5] ............... B62J 11/02; B62J 23/00; F04B 39/00
[52] U.S. Cl. ............... 224/30 R; 224/34; 224/38; 150/154; 150/161; 280/201
[58] Field of Search ............... 150/154, 161; 280/201; 224/30 R, 38, 31, 32 R, 34, 35, 37; 417/63, 555.1, 234, 572

[56] References Cited

U.S. PATENT DOCUMENTS

| 589,402 | 9/1897 | Badgley | 224/34 |
|---|---|---|---|
| 2,554,199 | 5/1951 | Lewis | 150/154 |
| 3,981,625 | 9/1976 | Wickenberg | 417/63 |
| 4,120,614 | 10/1978 | Bouder | 417/63 |
| 4,569,725 | 2/1986 | Brunet | 417/572 X |

FOREIGN PATENT DOCUMENTS

| 527635 | 11/1956 | Belgium | 150/154 |
|---|---|---|---|
| 3401124 | 7/1985 | Fed. Rep. of Germany | 224/30 R |
| 114893 | 9/1945 | Sweden | 224/38 |
| 566859 | 1/1945 | United Kingdom | 224/38 |
| 1232894 | 5/1971 | United Kingdom | 417/555.1 |
| 2047352 | 11/1980 | United Kingdom | 417/555.1 |

Primary Examiner—Sue A. Weaver

[57] ABSTRACT

A tight fitting, tubular cover designed to protect portable, (attached to bicycle), bicycle tire pumps. The cover itself is constructed of a stretchy material (10) to facilitate a tight fit around the tire pump. A zipper (20) is incorporated into the body (30) of the pump cover to ease insertion and removal of the pump into and out of the pump cover. When zipped shut, the pump cover forms a tight fitting barrier that protects the valve mechanism and other vital components of the bicycle pump from foreign matter. A clean pump is essential because during tire inflation a dirty pump nozzle can transmit debris to the valve core of the tires innertube, causing leakage.

5 Claims, 2 Drawing Sheets

1

PROTECTIVE COVER FOR PORTABLE BICYCLE TIRE PUMPS

BACKGROUND

1. Field of Invention

This invention relates to portable (attached to bike) bicycle tire pumps, specifically to a cover that protects the pump from debris.

2. Description of Prior Art

Heretofore, bicyclists carried tire pumps on their bikes in one of two ways. Either uncovered or partially covered by cutting a piece of old innertube to wrap around the valve mechanism of the pump. Using this "innertube method" is very ineffective for two reasons. First, the piece of innertube covers only the valve mechanism of the pump, leaving the pumps shaft and seals vulnerable to water and debris. Debris that enters the pumps internal components can eventually work its way down to the valve mechanism and can then be transmitted to the bicycle tires valve core during inflation. When debris is transmitted to the valve core of the bikes innertube it causes leakage, stranding the rider. Secondly, since the piece of innertube is merely wrapped around the pumps valve mechanism it does not form a water/debris-tight enclosure. Maintaining a pump that is free of debris is of critical concern to off-road cyclists, (mountain bikers), since they ride in remote areas, in sand, dirt, and wet terrain. It is in these conditions that a cyclist cannot afford to be stuck with a flat tire due to a leaking valve core.

OBJECTS AND ADVANTAGES

Accordingly, several objects and advantages of my invention are:
- (a) In covering the entire pump apparatus, my invention creates an impenetrable barrier protecting the valve mechanism as well as the shaft and seals of the pump from all forms of debris.
- (b) My invention extends the useful life of the pump by keeping the internal components free of debris.
- (c) My invention also lowers the wind resistance of the pump by covering it with a smooth, tight fitting shell.
- (d) My invention acts as a safety device when reflective material is used in its construction.
- (e) My invention has tremendous promotional value, as a company can emboss their logo along the entire length of the pump cover.
- (f) My invention also protects the pump while it is in storage or in transit, i.e. on top of a car.

Further objects and advantages of my invention will become apparent upon inspection of the drawings and ensuing description of the invention.

DRAWING FIGURES

FIG. 1 shows a comprehensive view of the pump cover complete with zipper closure.

FIG. 2 shows a similar view of the pump cover, but includes grommets pressed into each end of cover.

REFERENCE NUMERALS IN DRAWINGS 10 fabric
20 zipper
30 body of cover (consisting of 10 fabric)
40 seam
50 Grommets

DESCRIPTION OF FIGURES

A typical embodiment of the pump cover is shown in FIG. 1, (FIG. 2 shows same view, but with grommets 50 pressed into each end of pump cover). In the preferred embodiment, the body of the cover is constructed of a stretchy fabric 10. However, the cover can be constructed of any material that can be repeatedly stretched without tearing or losing its resiliency. To construct the pump cover, first select a piece of fabric to make up the body 30 of the cover. Cut the fabric into two strips of equal size. Then, by sewing, attach each side of fabric to a zipper 20. Sewing from the inside, sew the remaining two sides of the fabric together, (creating 40 seam), the resulting shape will be a tube of fabric with a zipper running down the middle. Now, sew both ends of the tube shut, (from the inside), to complete the construction. The resulting tube should be just large enough to facilitate a tight fit around the style of pump your fashioning the cover for. In the preferred embodiment, the zipper 20 extends almost the entire length of the cover. Approximately two inches of fabric extends past the zipper 20 on one end of the cover, and approximately one-half inch of fabric extends past the end of the zipper 20 on the other end.

OPERATION—FIG. 1

Figure 1:
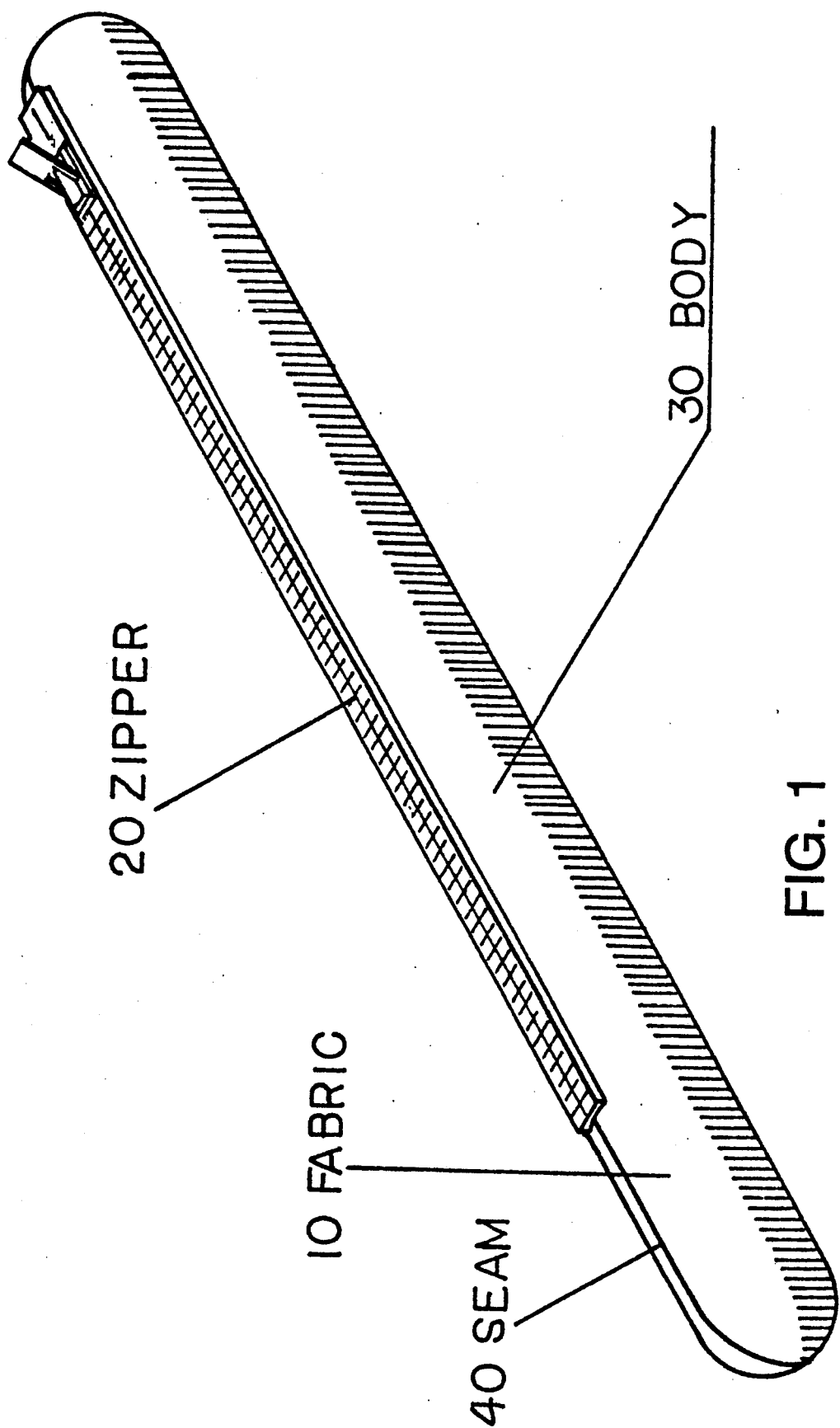
Figure 2:
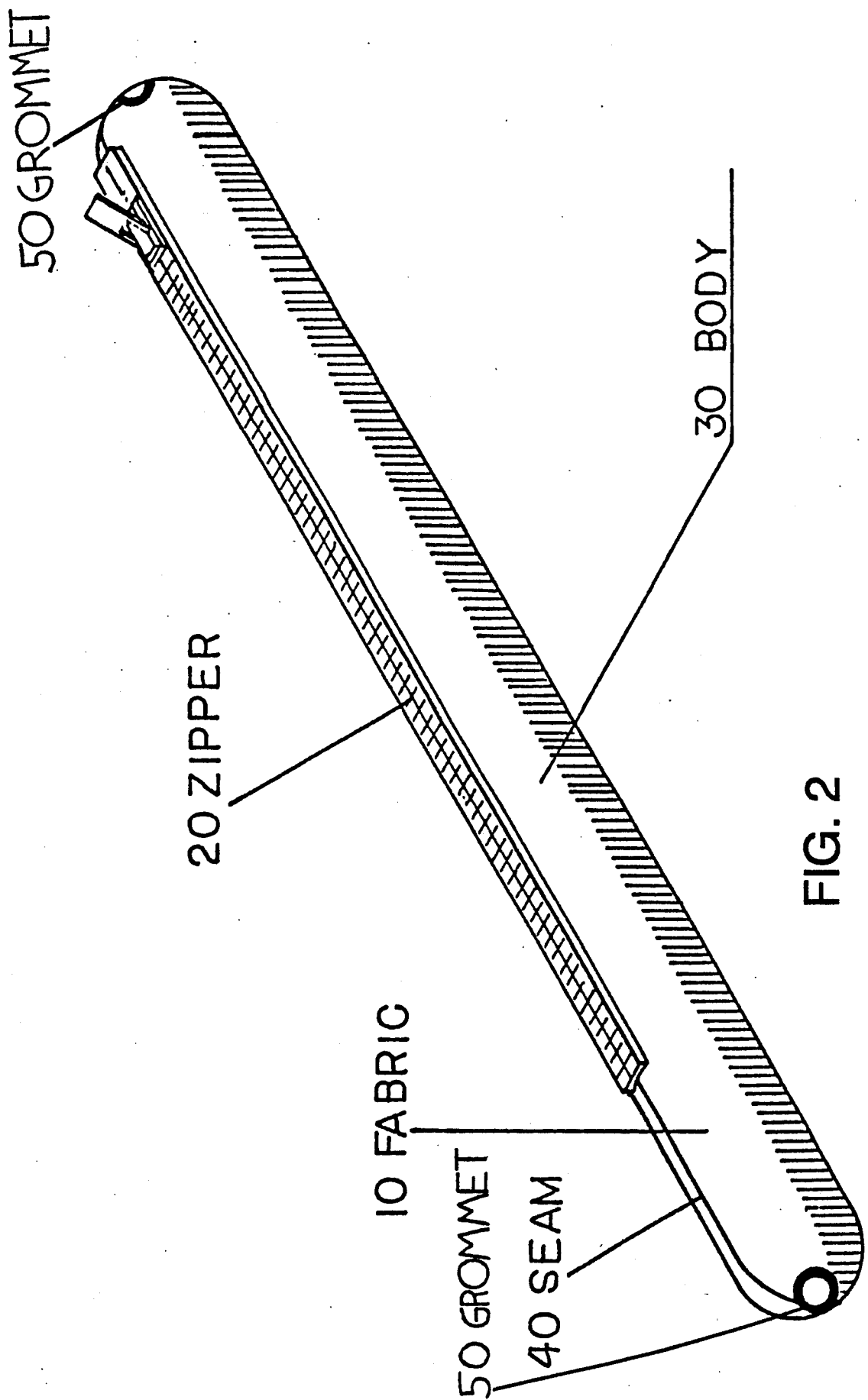

The manner of using the pump cover to protect a bicycle pump is very simple. First you unzip the zipper 20 completely. You then insert a bicycle pump (valve nozzle down, away from zipper 20) into the end of the pump cover body 30 that has the greater length of material extending past the zipper 20. You then compress the pumps handle, (pump handles are spring loaded), and insert the handle of the pump into the remaining end of the pump cover. You then grasp the zipper 20 and zip the body 30 of the pump cover closed. To remove the pump cover, first unzip the zipper 20. Then compress the handle of the pump and remove it from the pump cover body 30. Then, grab the valve mechanism side of the pump and slide the pump cover off the pump.

SUMMARY, RAMIFICATIONS, AND SCOPE

Accordingly, the reader will see that the full length pump cover easily and conveniently seals out dirt, water, and sand from entering a bicycle pumps valve mechanism and other vital components. Furthermore, my invention has additional advantages in that:
- it extends the life of the pump by inhibiting friction inducing particles from entering the pumps internal components;
- it acts as a safety device when reflective material is used in the covers construction, i.e. car lights reflect off of the cover, making the cyclist more visible to motorists;
- it lowers the pumps wind resistance by covering the pump with a tight fitting, smooth shell;
- it acts as a promotional device, allowing a company to emboss their logo along the entire length of the cover, turning the cover into a "roving billboard";
- it protects the bicycle pump while the bicycle is in transit, i.e. on top of a car. This keeps the pump free of road grime and insect guts while the pump is attached to the bike.

Although the descriptions above contain many specifications, these should not be construed as limiting the scope of the invention, but as merely providing illustrations of some of the presently preferred embodiments of this invention. For example, the ends of the pump cover can have eyelets or elastic bands sewn into them to facilitate a variety of commonly used mounting systems for attaching the pump to the bicycle. Another deviation could be the use of Velcro brand (made by Velcro U.S.A., Inc.) fasteners in place of the zipper on the pump cover. Thus the scope of the invention should be determined by the appended claims and their legal equivalents, rather than by the examples given.

I claim:

1. A protective cover and portable bicycle tire pump adapted to be attached to a bicycle frame, said cover comprising:

a. a piece of fabric or synthetic material in the shape of a tubular cylinder that closely conforms to the external configuration of the pump,
   b. a reclosable device affixed lengthwise into the cylinder, and
   c. a grommet pressed into each end of the cylinder.

2. The reclosable device of claim 1, wherein said device is a zipper.

3. The piece of fabric of claim 1, wherein the fabric is stretchy.

4. A one piece cover and bicycle tire pump adapted to be attached to a bicycle frame, said cover being in the shape of a cylinder and completely closed at each end, an opening provided along the length thereof and means for closing said opening.

5. The cover and pump of claim 4, wherein said closing means is a zipper.

* * * * *